US010902225B2

(12) United States Patent
Mochida (10) Patent No.: US 10,902,225 B2
(45) Date of Patent: Jan. 26, 2021

(54) CARD READER (71) Applicant: NIDEC SANKYO CORPORATION, Nagano (JP)

(72) Inventor: Tetsuo Mochida, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/531,477

(22) Filed: Aug. 5, 2019

(65) Prior Publication Data
US 2020/0050803 A1 Feb. 13, 2020

(30) Foreign Application Priority Data

Aug. 7, 2018 (JP) ................................ 2018-148188

(51) Int. Cl.
G06K 7/08 (2006.01)
G07F 19/00 (2006.01)
G06K 7/00 (2006.01)
G07F 7/08 (2006.01)
G01S 17/04 (2020.01)

(52) U.S. Cl.
CPC ............ G06K 7/084 (2013.01); G01S 17/04 (2020.01); G06K 7/0095 (2013.01); G07F 7/0873 (2013.01); G07F 19/2055 (2013.01)

(58) Field of Classification Search
USPC ........................................ 235/379, 449, 493
See application file for complete search history.

(56) References Cited

U.S. PATENT DOCUMENTS

| 6,189,791 | B1 * | 2/2001 | Takita | G06K 7/084 235/449 |
| 2012/0002313 | A1 * | 1/2012 | Miyabe | G06K 7/084 360/2 |
| 2013/0299582 | A1 * | 11/2013 | Ozawa | G06K 13/0875 235/440 |
| 2016/0140366 | A1 * | 5/2016 | Tanaka | G06K 7/087 235/449 |
| 2017/0185811 | A1 * | 6/2017 | Hoson | G06K 7/087 |
| 2018/0196971 | A1 * | 7/2018 | Sakamaki | G06K 7/084 |

FOREIGN PATENT DOCUMENTS

WO 2011093340 A1 8/2011

* cited by examiner

Primary Examiner — Tuyen K Vo
(74) Attorney, Agent, or Firm — Cantor Colburn LLP (57) ABSTRACT A card reader may include a transport path; a housing; a magnetic head to read the magnetic information at a reading position of the transport; and a first inductive proximity sensor. The first inductive proximity sensor may include a first oscillation circuit; and first and second detection coils connected in parallel to the first oscillation circuit. The magnetic head may be accessible to the magnetic card from a first side of the transport path in a first direction perpendicular to a transport face of the magnetic card. Coil center lines of the first and second detection coils may extend in the first direction on the first side of the transport path. The first and second detection coils may be disposed adjacent to each other in the transport direction and structured to generate magnetic fields in opposite directions in the first direction when the first inductive proximity sensor is driven.

20 Claims, 6 Drawing Sheets

CARD READER

CROSS REFERENCE TO RELATED APPLICATION

The present application claims priority under 35 U.S.C. § 119 to Japanese Application No. 2018-148188 filed Aug. 7, 2018, the entire content of which is incorporated herein by reference.

FIELD OF THE INVENTION

At least an embodiment of the present invention relates to a card reader that reads magnetic information from a magnetic card.

BACKGROUND

International Publication No. 2011/093340 discloses a card reader that transports a magnetic card inserted into an insertion slot along a transport path and reads magnetic information from the magnetic card with a magnetic head. Such a card reader is vulnerable to a fraudulent act of illegally acquiring the magnetic information with a magnetic head or skimming head disposed in the vicinity of the insertion slot.

As a countermeasure against such a fraudulent act, the card reader described in International Publication No. 2011/093340 includes a metal sensor disposed on the front face of a housing having an insertion slot. The metal sensor is a magnetic differential sensor, and includes two excitation coils wound around the center of a core body and two detection coils wound around the two ends of the core body. When a skimming head, which includes metal parts, is disposed in the vicinity of the insertion slot, the metal sensor can detect the fraudulently installed skimming head on the basis of fluctuation in the output from the metal sensor.

A skimming head may be disposed in a card transport path. In specific, a skimming head may be disposed to the interior of the housing at a position further inward than the insertion slot.

It is desirable to dispose the metal sensor inside the housing near the transport path, to detect a skimming head disposed to the interior of the housing at such a position. Unfortunately, the metal sensor disposed inside the housing detects metal structures present in the interior of the housing. Thus, the detection accuracy of metal objects by the metal sensor may be low compared to the detection accuracy of the metal sensor disposed on the front face of the housing.

At least an embodiment of the present invention, which has been conceived in light of the problems described above, provides a card reader that can accurately detect a foreign object including a metal part with a metal sensor disposed inside a housing of the card reader.

SUMMARY

A card reader according to at least an embodiment of the present invention, which has been made to solve the above-described issues, includes a transport path structured to transport a magnetic card on which magnetic information is recorded; a housing internally provided with the transport path; a magnetic head structured to read the magnetic information at a reading position midway of the transport path in a transport direction of the magnetic card; a first inductive proximity sensor including a first oscillation circuit; and a first detection coil and a second detection coil connected in parallel to the first oscillation circuit; the magnetic head being accessible to the magnetic card transported through the transport path from one side in a vertical direction vertical to a transport face of the magnetic card in the transport path; a coil center line of the first detection coil and a coil center line of the second detection coil extending in the vertical direction on one side of the transport path in the vertical direction; and the first detection coil and the second detection coil being disposed adjacent to each other in the transport direction and structured to generate magnetic fields in opposite directions in the vertical direction when the first inductive proximity sensor is driven.

According to at least an embodiment of the present invention, an inductive proximity sensor may be provided in the vicinity of the transport path. Thus, when a foreign object including a metal part, such as a skimming head, is disposed in the vicinity of the transport path, the foreign object can be detected on the basis of fluctuation of the output from the inductive proximity sensor. In specific, the first inductive proximity sensor generates a high-frequency magnetic field by the first and second detection coils connected to the first oscillation circuit. Thus, when a foreign object including a metal part is placed in the generated magnetic field, an induced current (eddy current) flows through the foreign object. As a result, the impedances of the detection coils vary, and thereby the output from the inductive proximity sensor fluctuates. Thus, a disposed foreign object can be detected on the basis of the fluctuation of the output from the inductive proximity sensor. When the first inductive proximity sensor includes one detection coil, the magnetic flux of the magnetic field extends from one end of the detection coil to the other end in the vertical direction. Thus, the magnetic field expands in the vertical direction. In contrast, when the first inductive proximity sensor includes a first detection coil and a second detection coil disposed adjacent to each other in the transport direction and structured to generate magnetic fields in opposite directions to each other in the vertical direction, the magnetic fluxes of the high-frequency magnetic fields extend, for example, from the first detection coil to the second detection coil on one side of the detection coils in the vertical direction and from the second detection coil to the first detection coil on the other side of the detection coils. Thus, the magnetic fields expand along the transport direction on the two sides of the first detection coil and the second detection coil in the vertical direction. Thus, the first inductive proximity sensor can be disposed in the vicinity of the transport path to detect a foreign object in a wide range along the transport direction of the transport path. The magnetic field expanding along the transport direction can prevent or suppress the inductive proximity sensor from detecting metal structures disposed apart from the transport path. Thus, a foreign object disposed in the transport path can be accurately detected.

In at least an embodiment of the present invention, the first detection coil and the second detection coil may have opposite winding directions with each other in view from the vertical direction. In this way, the magnetic field generated by the first detection coil and the magnetic field generated by the second detection coil can readily have opposite directions in the vertical direction.

In at least an embodiment of the present invention, the first detection coil and the second detection coil may be disposed at the same position as the position of the magnetic head along a width direction of the transport path orthogonal to the transport direction and the vertical direction, and are disposed at positions different from the position of the magnetic head along the transport direction. The skimming head for reading magnetic information from a magnetic card is likely to be disposed at the same position as the magnetic head along the width direction. Thus, the illegal skimming head can be readily detected if the first detection coil and the second detection coil are disposed at such a position.

In at least an embodiment of the present invention, the card reader may include a plate member extending in the transport direction and defining a portion of the transport face, and the first detection coil and the second detection coil may be disposed on a side of the transport path opposite to the plate member. In this way, the plate member covers the first detection coil and the second detection coil from the side of the transport path, and thus the first detection coil and the second detection coil do not wear due to contact with the magnetic card.

In at least an embodiment of the present invention, the card reader may include a second inductive proximity sensor including a second oscillation circuit and one third detection coil connected to the second oscillation circuit. A coil center line of the third detection coil may extend in the vertical direction on one side of the transport path in the vertical direction, and the third detection coil may be disposed on a side of the magnetic head opposite to the first detection coil and the second detection coil in the transport direction. Thus, the second inductive proximity sensor can detect a foreign object at a position different from the detection position of foreign objects by the first detection coil and the second detection coil.

In at least an embodiment of the present invention, the housing may have an insertion slot for inserting the magnetic card into the transport path; the third detection coil may be disposed closer to the insertion slot than the magnetic head; and the first detection coil and the second detection coil may be disposed on a side of the magnetic head opposite to the insertion slot. The high-frequency magnetic field generated by the second inductive proximity sensor expands wider in the vertical direction in comparison with the high-frequency magnetic field generated by the first inductive proximity sensor including the first detection coil and the second detection coil. Thus, the third detection coil of the second inductive proximity sensor disposed at a position near the insertion slot can detect a foreign object disposed in the transport path at a position near the insertion slot within a wide range in the vertical direction. The third detection coil disposed at a position close to the insertion slot can reduce the influence of metal structures present inside the housing on the output of the second inductive proximity sensor.

In at least an embodiment of the present invention, it is desirable that the card reader include a support mechanism structured to support the magnetic head such that the magnetic head is shiftable in the vertical direction; the support mechanism include a resilient metal plate member extending along the transport path on a side of the transport path opposite to the first detection coil and the second detection coil in the vertical direction; the magnetic head be disposed on the resilient metal plate member; and a first distance between the transport face and the first detection coil or the second detection coil in the vertical direction be shorter than a second distance between the resilient metal plate member and the first detection coil or the second detection coil in the vertical direction. In this way, the magnetic head can readily come into contact with the magnetic card. The first distance between the transport face and the first detection coil or the second detection coil in the vertical direction is smaller than the second distance between the resilient metal plate member and the first detection coil or the second detection coil in the vertical direction. Thus, even when the resilient metal plate member is disposed in the second direction of the first detection coil and the second detection coil, the influence of the resilient metal member is reduced on the output from the first dielectric proximity sensor including the first detection coil and the second detection coil.

According to at least an embodiment of the present invention, an inductive proximity sensor may be provided in the vicinity of the transport path. Thus, a foreign object including a metal part, such as a skimming head, can be detected in the vicinity of the transport path on the basis of fluctuation of the output from the inductive proximity sensor. The inductive proximity sensor includes a first detection coil and a second detection coil disposed adjacent to each other in the transport direction and have opposite winding directions with each other. Thus, the magnetic flux of the high-frequency magnetic field generated by the inductive proximity sensor expands along the transport direction. Thus, the inductive proximity sensor can be disposed in the vicinity of the transport path of the inductive proximity sensor to detect a foreign object disposed in the transport path in a wide range along the transport direction. The magnetic flux generated by the inductive proximity sensor expanding along the transport direction can prevent or suppress the inductive proximity sensor from detecting a metal structure disposed apart from the transport path. Thus, a foreign object disposed in the transport path can be accurately detected.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A card reader according to at least an embodiment of the present invention will now be described with reference to the accompanying drawings.

Card Reader

Figure 1:
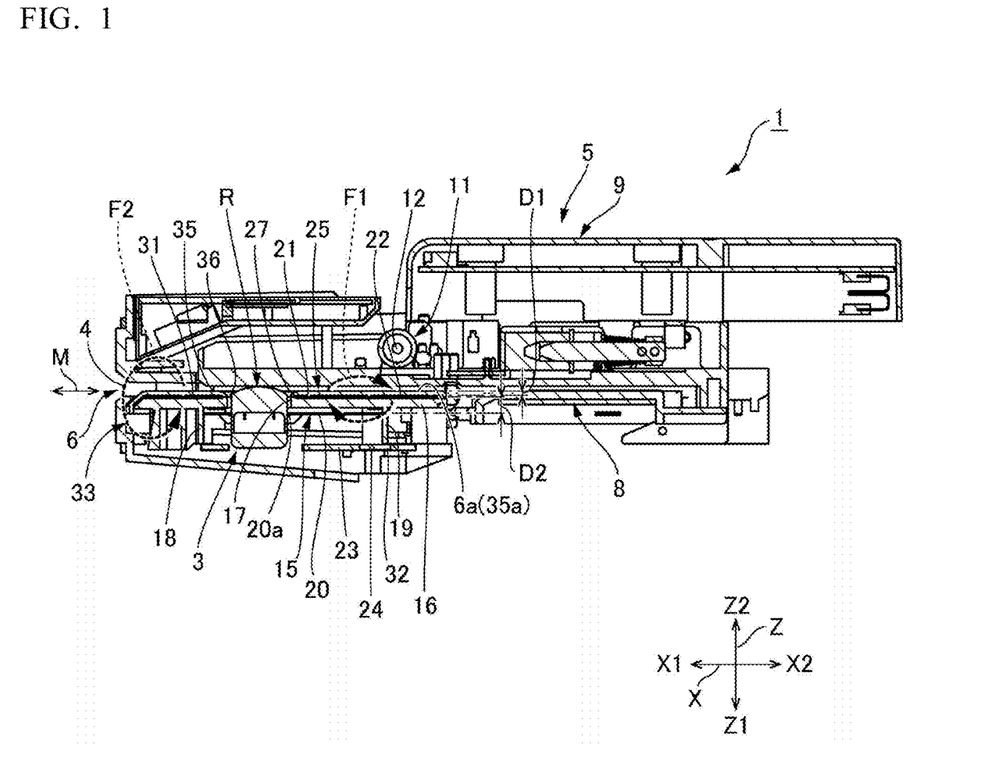
FIG. 1 is a cross-sectional view of a card reader according to at least an embodiment of the present invention.
Figure 2:
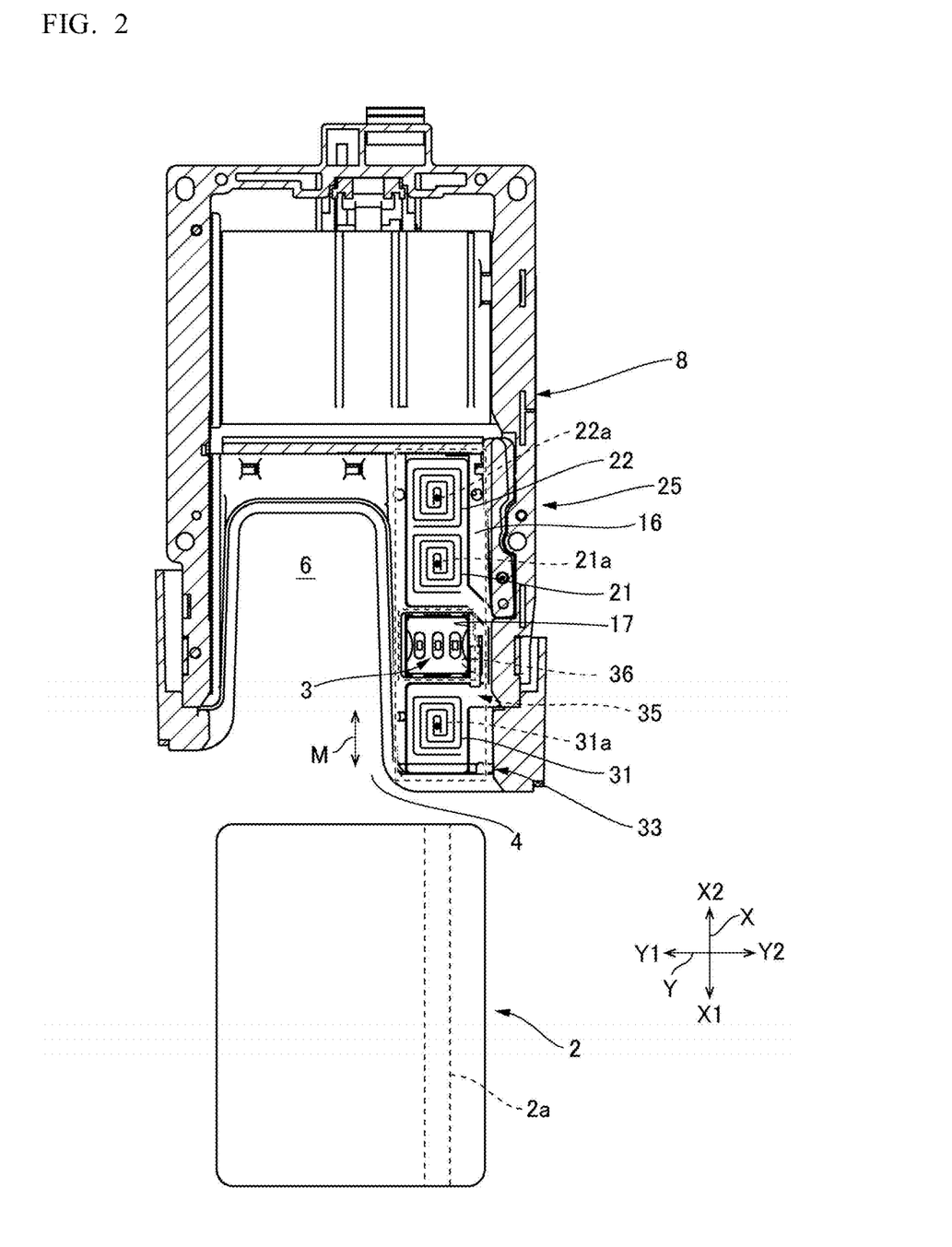
FIG. 2 illustrates the planar configuration of a magnetic card and the card reader.
Figure 3:
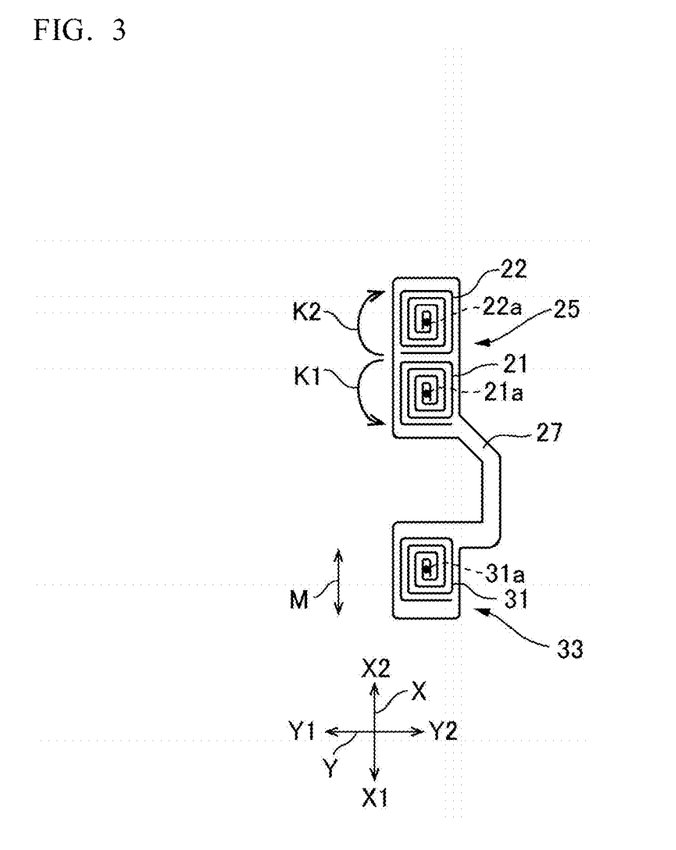
FIG. 3 is a plan view of a flexible printed circuit board including a first detection coil, a second detection coil, and a third detection coil.
Figure 4:
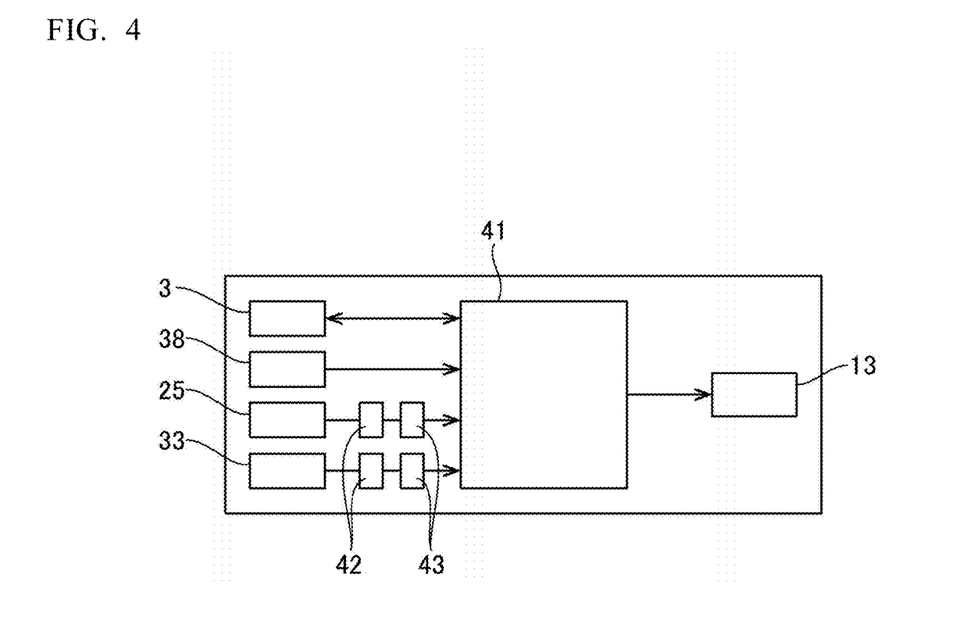
FIG. 4 is a schematic block diagram illustrating a control system of the card reader.

FIG. 1 is a cross-sectional view of a card reader 1 according to at least an embodiment of the present invention. FIG. 2 illustrates the planar configuration of a magnetic card 2 and the card reader 1. FIG. 3 is a plan view of a flexible printed circuit board including a first detection coil, a second detection coil, and a third detection coil. FIG. 4 is a schematic block diagram illustrating a control system of the card reader 1. The card reader 1 reads magnetic information recorded on the magnetic card 2 and writes magnetic information on the magnetic card 2. The card reader 1 is connected to a predetermined higher-order device.

The magnetic card 2 is made of, for example, vinyl chloride and has a thickness of approximately 0.7 to 0.8 mm. With reference to FIG. 2, one face of the magnetic card 2 is provided with a magnetic strip 2a in which magnetic information is recorded. The magnetic strip 2a extends in the longitudinal direction of the rectangular magnetic card 2 at a predetermined position in the short direction. The magnetic card 2 may also include a built-in integrated circuit (IC) chip.

With reference to FIG. 1, the card reader 1 includes a housing 5 having an insertion slot 4 for the magnetic card 2 on the front face, and a transport path 6 extending inside the housing 5. The housing 5 includes a lower frame 8 disposed below the transport path 6 and an upper frame 9 disposed above the transport path 6. The transport path 6 extends from the insertion slot 4 over the magnetic head 3. The transport path 6 linearly extends rearward from the insertion slot 4.

The card reader 1 further includes a transport mechanism 11 for transporting the magnetic card 2 inserted into the insertion slot 4 along the transport path 6. The transport mechanism 11 includes a transport roller 12 and a transport motor 13 (see FIG. 4) that is a drive source of the transport roller 12. The transport roller 12 is rotatably supported by the upper frame 9.

In the following description, three directions orthogonal to each other are denoted as the front-rear direction X, the width direction Y, and the up-down direction Z of the card reader 1. The front-rear direction X is the direction in which the transport path 6 extends and is the transport direction M in which the magnetic card 2 is transported. The Y direction is the width direction of the transport path 6. The Z direction is the up-down direction Z and is the vertical direction vertical to the transport face 6a of the transport path 6. In the front-rear direction X, the insertion slot 4 is dispose on the front side X1. The side opposite to the front side X1 in the front-rear direction X is referred to as the rear side X2. The bottom side of the card reader 1 in an installed state is referred to as the lower side Z1, and the top side as the upper side Z2.

The magnetic head 3 reads magnetic information from the magnetic strip 2a of the magnetic card 2 at a reading position R at midway of the transport path 6 in the transport direction M. The reading position R is a position upstream of the transport roller 12 in the transport direction M. In specific, the reading position R is closer to the insertion slot 4 than the transport roller 12. The magnetic head 3 may write magnetic information to the magnetic card 2.

The magnetic head 3 is supported by the lower frame 8 via a support mechanism 15. The support mechanism 15 supports the magnetic head 3 such that the magnetic head 3 is shiftable in the up-down direction Z. More specifically, the lower frame 8 includes a planar frame portion 16 extending along the transport path 6 below the transport path 6 on the lower side Z1. The frame portion 16 has a through portion 17 through which the magnetic head 3 passes in the up-down direction Z. The support mechanism 15 includes a front protrusion 18 protruding from the front side X1 to the lower side Z1 of the magnetic head 3 in the frame portion 16; a rear protrusion 19 protruding from the rear side X2 to the lower side Z1 of the magnetic head 3 in the frame portion 16; and a plate spring 20 (a resilient metal plate member) bridging the front protrusion 18 and the rear protrusion 19.

The plate spring 20 extends in the front-rear direction X between the front protrusion 18 and the rear protrusion 19. The plate spring 20 can elastically deform between the front protrusion 18 and the rear protrusion 19. The magnetic head 3 is fixed on an attachment 20a disposed on the front portion of the plate spring 20. The upward and downward bending of the plate spring 20 causes the magnetic head 3 to shift in the up-down direction Z. In this embodiment, the rear portion of the plate spring 20 disposed rearward of the attachment 20a for the magnetic head 3 overlaps the front end portion of the first detection coil 21 and the second detection coil 22 in view from the upper side Z2. The front portion of the plate spring 20 disposed forward of the attachment 20a for the magnetic head 3 overlaps the rear end portion of the third detection coil 31 in view from the upper side Z2.

The card reader 1 further includes the first detection coil 21 and the second detection coil 22 disposed between the magnetic head 3 and the transport roller 12 in the front-rear direction X. The first detection coil 21 and the second detection coil 22 constitute a first metal sensor 25, together with a first oscillation circuit 24 disposed on the circuit board 23 disposed on the lower side Z1 of the frame portion 16 and the plate spring 20. The first metal sensor 25 is an inductive proximity sensor and generates high-frequency magnetic fields from the first detection coil 21 and the second detection coil 22 by driving the first oscillation circuit 24.

With reference to FIG. 3, the first detection coil 21 and the second detection coil 22 are patterned on a flexible printed circuit board 27. The flexible printed circuit board 27 is fixed along the upper face of the frame portion 16 such that the coil center line 21a of the first detection coil 21 and the coil center line 22a of the second detection coil 22 extend along the up-down direction Z on the lower side Z1 of the transport path 6. The first detection coil 21 and the second detection coil 22 are disposed adjacent to each other in the transport direction M. The winding direction K1 of the first detection coil 21 and the winding direction K2 of the second detection coil 22 are opposite to each other when the first detection coil 21 and the second detection coil 22 are viewed from the up-down direction Z. The first detection coil 21 is disposed closer to the magnetic head 3 than the second detection coil 22.

The first detection coil 21 and the second detection coil 22 are disposed adjacent to each other in the transport direction M. The first detection coil 21 and the second detection coil 22 have winding directions opposite to each other and generate magnetic fields in directions opposite to each other in the up-down direction Z when the first metal sensor 25 is driven. Thus, as indicated by the dotted arrows in FIG. 1, the magnetic fluxes F1 of the magnetic fields generated by the first detection coil 21 and the second detection coil 22 extend, for example, from the first detection coil 21 to the second detection coil 22 on one side of the coils 21 and 22 in the up-down direction Z and from the second detection coil 22 to the first detection coil 21 on the other side of the coils 22 and 22 in the up-down direction Z. Thus, the magnetic fields expand along the transport direction M on the both sides of the first detection coil 21 and the second detection coil 22 in the up-down direction Z.

The card reader 1 further includes the third detection coil 31 disposed between the magnetic head 3 and the insertion slot 4 in the front-rear direction X. The third detection coil 31 constitutes a second metal sensor 33 (second inductive proximity sensor), together with a second oscillation circuit 32 disposed on the circuit board 23. The second metal sensor 33 is an inductive proximity sensor and generates a high-frequency magnetic field from the third detection coil 31 by driving the second oscillation circuit 32.

The third detection coil 31 is patterned on the flexible printed circuit board 27. The flexible printed circuit board 27 is fixed along the upper face of the frame portion 16 such that the coil center line 31a of the third detection coil 31 extends along the up-down direction Z on the lower side Z1 of the transport path 6. As indicated by the dotted arrow in FIG. 1, in the case where one third detection coil 31 is provided, the magnetic flux F2 of the magnetic field extends, for example, from one end of the third detection coil 31 to the other end in the up-down direction Z. Thus, the magnetic field expands in the up-down direction Z.

As illustrated in FIG. 2, the first detection coil 21 and the second detection coil 22 are disposed at the same position as the magnetic head 3 along the width direction Y of the transport path 6 and at positions different from the magnetic head 3 along the transport direction M (on the rear side X2 of the magnetic head 3). The third detection coil 31 is disposed at the same position as the magnetic head 3 along the width direction Y of the transport path 6 and at a position different from the magnetic head 3 in the transport direction M (on the front side X1 of the magnetic head 3). The position of the magnetic head 3 along the width direction Y is a position facing the magnetic strip 2a when the magnetic card 2 is inserted into the transport path 6 through the insertion slot 4. Thus, the first detection coil 21, the second detection coil 22, and the third detection coil 31 are disposed at positions passed by the magnetic strip 2a when the magnetic card 2 is inserted into the transport path 6 through the insertion slot 4.

The first detection coil 21, the second detection coil 22, and the third detection coil 31 are covered with a plate member 35 covering the frame portion 16 from the upper side Z2. In specific, the first detection coil 21, the second detection coil 22, and the third detection coil 31 are disposed on a side of the transport path 6 opposite to the plate member 35. The plate member 35 is made of resin. The plate member 35 has a rectangular shape elongated in the front-rear direction X in view from the upper side Z2. The plate member 35 has a hole 36 through which the magnetic head 3 passes in the up-down direction Z. The plate member 35 has a front end portion curved toward the lower side Z1. The upper face 35a of the plate member 35 defines a portion of the transport face 6a (the lower face of the transport path 6).

As illustrated in FIG. 1, the first distance D1 between the transport face 6a and the first detection coil 21, the second detection coil 22 or the third detection coil 31 in the up-down direction Z is smaller than the second distance D2 between the plate spring 20 and the first detection coil 21, the second detection coil 22, or the third detection coil 31 in the up-down direction Z.

An insertion detection sensor 38 (see FIG. 4) that detects the insertion of the magnetic card 2 is disposed in the transport path 6 between the magnetic head 3 and the transport roller 12 in the transport direction M. The insertion detection sensor 38 may be a contact type sensor that detects the insertion of the magnetic card 2 when the magnetic card 2 comes into contact with the insertion detection sensor 38. Alternatively, the insertion detection sensor 38 may be an optical type sensor that detects the insertion of the magnetic card 2 when the magnetic card 2 blocks the detection light.

The card reader 1 further includes a control unit 41. As illustrated in FIG. 4, the magnetic head 3 is connected to the input side of the control unit 41 via a driver (not illustrated). The insertion detection sensor 38 is also connected to the input side of the control unit 41. The first metal sensor 25 and the second metal sensor 33 are also connected to the input side of the control unit 41 via low-pass filters 42 and A/D conversion circuits 43. The transport motor 13 is connected to the output side of the control unit 41 via a driver (not illustrated).

In response to the insertion detection sensor 38 detecting the insertion of the magnetic card 2 into the transport path 6, the control unit 41 drives the transport motor 13 to transport the magnetic card 2 toward the rear side X2 until the rear end of the magnetic card 2 in the insertion direction passes the magnetic head 3. The control unit 41 drives the magnetic head 3 to read the magnetic information stored in the magnetic strip 2a while the magnetic card 2 passes the magnetic head 3. When the magnetic card 2 is passes the magnetic head 3 in the direction toward the rear side X2, the control unit 41 drives the transport motor 13 in the opposite direction to transport the magnetic card 2 toward the front side X1. In this way, the control unit 41 causes the front end portion of the magnetic card 2 to externally protrude from the insertion slot 4 in the direction toward the front side X1.

If the control unit 41 detects a foreign object including a metal part in the vicinity of the transport path 6 on the basis of the outputs from the first metal sensor 25 and the second metal sensor 33, the control unit 41 does not drive the transport motor 13 and stops transporting the magnetic card 2 along the transport path 6. An example of a foreign object including a metal part is an illegal magnetic head, such as a skimming head, disposed in the transport path 6.

First Metal Sensor and Method of Detecting Foreign Object by First Metal Sensor

Figure 5A:
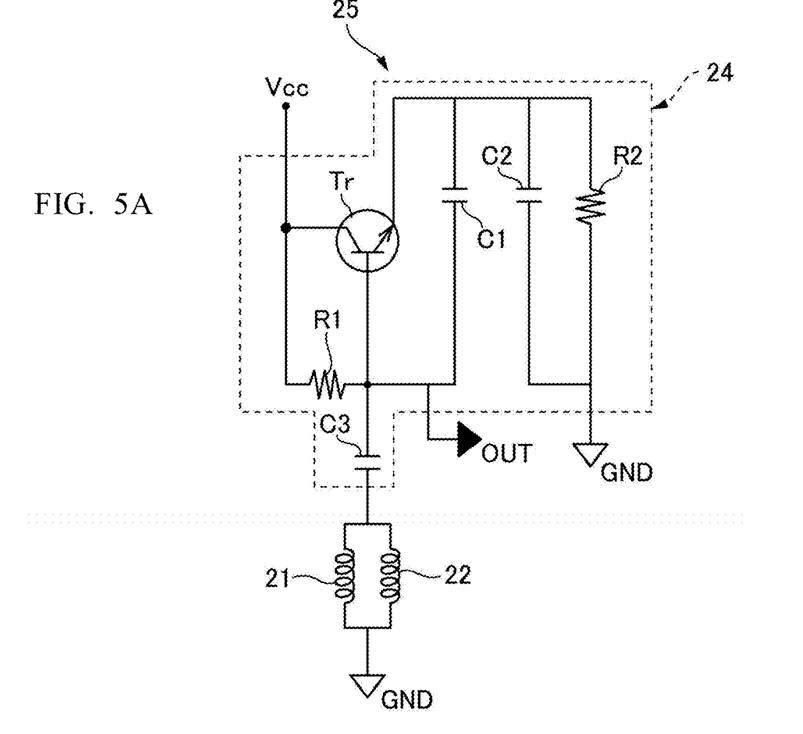
FIG. 5A to FIG. 5C illustrate a first metal sensor.
Figure 5B:
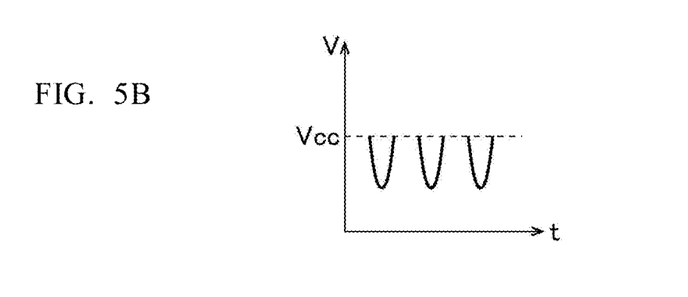
Figure 5C:
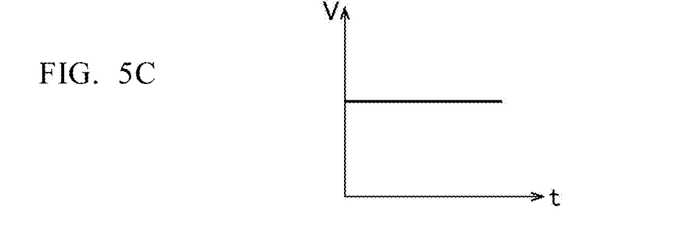

The first metal sensor 25 will now be described in detail with reference to FIG. 5A to FIG. 5C. FIG. 5A is a circuit diagram of the first metal sensor 25. FIG. 5B illustrates the waveform of a signal output from the first metal sensor 25. FIG. 5C illustrates a voltage signal output from the low-pass filter 42. With reference to FIG. 5A, the first metal sensor 25 includes the first oscillation circuit 24.

The first oscillation circuit 24 includes a transistor Tr having a connector connected to a supply voltage terminal Vcc, a first resistive element R1 connected to both the collector and the base of the transistor Tr, and a first capacitor C1 connected to both the emitter and the base of the transistor Tr. The first oscillation circuit 24 further includes a second capacitor C2 and a second resistive element R2 connected in parallel to both the emitter of the transistor Tr and the ground terminal GND. The first oscillation circuit 24 further includes a third capacitor C3 having a first terminal connected to both the first resistive element R1 and the first capacitor C1. An output terminal OUT is provided between the first terminal of the third capacitor C3 and the first capacitor C1. The first detection coil 21 and the second detection coil 22 are connected in parallel to both a second terminal of the third capacitor C3 and the ground terminal GND.

In this embodiment as illustrated in FIG. 5B, the output from the first metal sensor 25 or the output signal from the output terminal OUT has the same waveform as a rectified signal obtained by rectifying a voltage signal fluctuating in a predetermined cycle, at a rectifying circuit. As illustrated in FIG. 5C, the output signal passes through the low-pass filter 42 and is converted to a voltage signal having a level corresponding to the amplitude of the output signal. The voltage signal passes through the A/D conversion circuit 43 to be converted to a digital signal and is input to the control unit 41.

When the first oscillation circuit 24 operates, the first detection coil 21 and the second detection coil 22 generate high-frequency magnetic fields. When a foreign object including a metal part is placed in the generated magnetic fields, an induced current (eddy current) flows through the foreign object. As a result, the impedances of the first detection coil 21 and the second detection coil 22 vary, and thereby the amplitude of the output signal from the output terminal OUT fluctuates. Thus, the voltage signal corresponding to the amplitude of the output signal fluctuates. Thus, when the fluctuation of the voltage signal exceeds a predetermined threshold, the control unit 41 receiving a digital signal of the voltage signal can detect that the foreign object including a metal part is disposed.

In this embodiment, when the voltage signal fluctuates from the moving average of the latest seven points by more than the threshold value, the control unit 41 detects that a foreign object is disposed. After the insertion detection sensor 38 detects the insertion of the magnetic card 2 into the transport path 6, the control unit 41 detects that a foreign object is disposed, if the voltage signal generated when the magnetic card 2 is ejected from the insertion slot 4 fluctuates the moving average of seven points prior to the insertion of the magnetic card 2 by more than the threshold value.

The second oscillation circuit 32 of the second metal sensor 33 has a circuit configuration similar to that of the first oscillation circuit 24. In the second metal sensor 33, one third detection coil 31 is connected to both a second terminal of the third capacitor C3 and the ground terminal GND. Note that the principle of detection of a foreign object including a metal part by an output from the second metal sensor 33 is the same as that of the first metal sensor 25. The method of detecting a foreign object by the control unit 41 on the basis of an output from the second metal sensor 33 is similar to the method of detecting a foreign object on the basis of an output from the first sensor.

Operation and Effect

The card reader 1 according to this embodiment includes the first metal sensor 25 and the second metal sensor 33 in the vicinity of the transport path 6. Thus, when a foreign object including a metal part, such as a skimming head, is disposed in the vicinity of the transport path 6, the foreign object can be detected on the basis of fluctuation of the outputs from the first metal sensor 25 and the second metal sensor 33.

Since the first metal sensor 25 includes the first detection coil 21 and the second detection coil 22, which are disposed adjacent in the transport direction M and have winding directions opposite to each other, the high-frequency magnetic field expands in along the transport direction M. Thus, the first metal sensor 25 can detect a foreign object disposed in the transport path 6 in a wide range in the transport direction M. Since the magnetic field expands along the transport direction M, detection of metal structures disposed apart from the transport path 6 by the first metal sensor 25 can be prevented or suppressed. Thus, the card reader 1 according to this embodiment can accurately detect a foreign object disposed in the transport path 6.

In this embodiment, the first detection coil 21 and the second detection coil 22 are disposed at the same position as the magnetic head 3 along the width direction Y of the transport path 6 and at positions different from the magnetic head 3 along the transport direction M. The skimming head for illegally reading magnetic information is likely to be disposed at the same position as the magnetic head 3 along the width direction Y. Thus, the skimming head can be readily detected if the first detection coil 21 and the second detection coil 22 are disposed at a such position.

In this embodiment, the card reader 1 includes the second metal sensor 33. Thus, the second metal sensor 33 can detect a foreign object at a position different from the detection positions of a foreign object by the first detection coil 21 and the second detection coil 22.

The high-frequency magnetic field generated by the second metal sensor 33 expands wider in the up-down direction Z in comparison with the high-frequency magnetic fields generated by the first metal sensor 25 including the first detection coil 21 and the second detection coil 22. Thus, the second metal sensor 33 disposed at a position near the insertion slot 4 can detect a foreign object disposed in the transport path 6 within a wide range in the up-down direction Z near the insertion slot 4. Since the third detection coil 31 is disposed close to the insertion slot 4, the output of the second metal sensor 33 is less influenced by the metal structures present inside the housing 5.

This embodiment includes the plate spring 20 supporting the magnetic head 3 such that the magnetic head 3 is shiftable in the up-down direction Z. Thus, the magnetic head 3 can readily come into contact with the magnetic card 2. The first distance D1 between the transport face 6a and the first detection coil 21 or the second detection coil 22 in the up-down direction Z is smaller than the second distance D2 between the plate spring 20 and the first detection coil 21 or the second detection coil 22 in the up-down direction Z. Thus, even when the metal plate spring 20 is disposed on the lower side Z1 of the first detection coil 21 and the second detection coil 22, the output from the first metal sensor 25 is prevented from being affected by the plate spring 20.

The first detection coil 21 and the second detection coil 22 may have the same winding direction in view from the up-down direction Z. In such a case, currents are fed to the first detection coil 21 and the second detection coil 22 in opposite directions. As a result, the first detection coil 21 and the second detection coil 22 generate magnetic fields in opposite directions in the up-down direction Z. Thus, the high-frequency magnetic fields generated by the first detection coil 21 and the second detection coil 22 expand along the transport direction M.

Modification

Figure 6A:
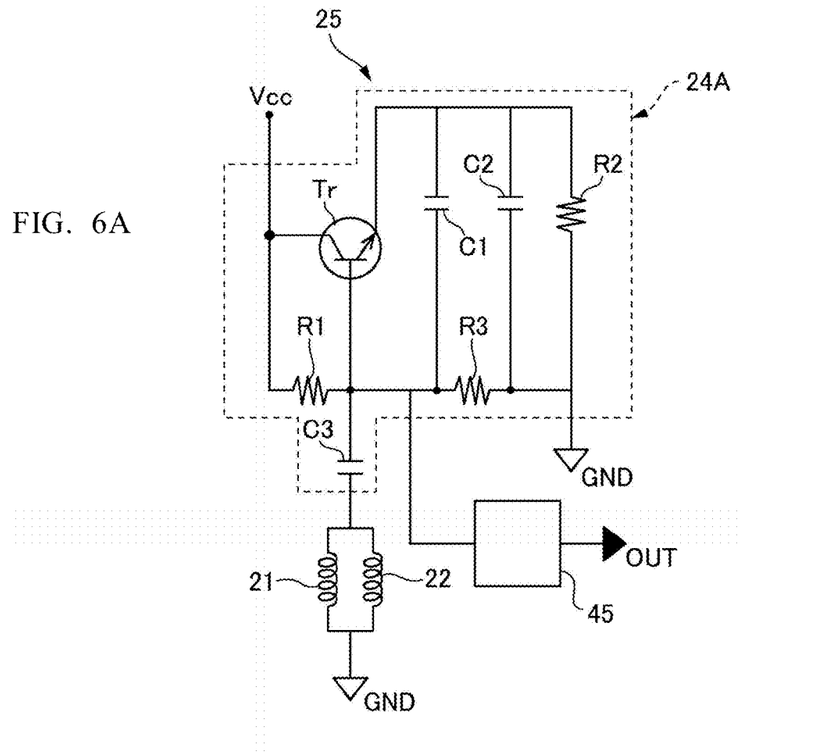
FIG. 6A to FIG. 6C illustrate a first metal sensor including an oscillation circuit according to a modification.
Figure 6B:
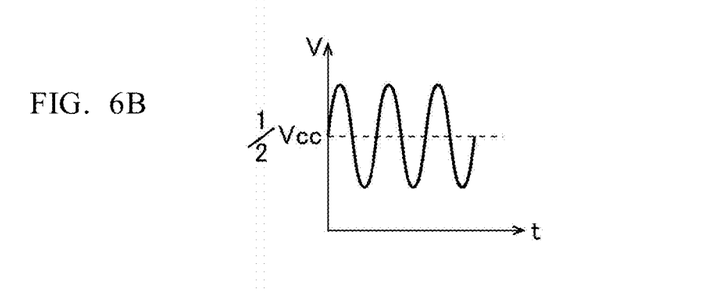
Figure 6C:
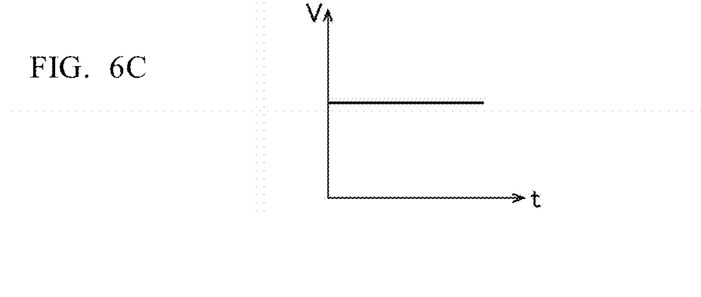

Another example of the oscillation circuits in the metal sensors 25 and 33 will now be described. FIG. 6A is a circuit diagram of a first metal sensor 25 including an oscillation circuit 24A according to a modification. FIG. 6B illustrates the waveform of a signal output from the first metal sensor 25. FIG. 6C illustrates a voltage signal output from the low-pass filter 42. As illustrated in FIG. 6A, the oscillation circuit 24A according to this modification is the same configuration as that of the first oscillation circuit 24 except that a resistance element R3 is provided. The third resistance element R3 is connected to both the output terminal OUT of the first capacitor C1 and the ground terminal GND of the second capacitor C2.

As in this modification illustrated in FIG. 6B, the output from the first metal sensor 25 or an output signal from the output terminal OUT fluctuates at a predetermined cycle around a voltage equal to half the supply voltage Vcc. Thus, when the oscillation circuit 24A according to this modification is used in the first metal sensor 25, the rectifying circuit 45 is connected to the output terminal OUT. In specific, when the oscillation circuit 24A according to this modification is used, the rectifying circuit 45, the low-pass filter 42, and the A/D conversion circuit 43 are disposed in this order between the oscillation circuit 24A and the control unit 41. As illustrated in FIG. 6C, the output signal passes through the rectifying circuit 45 and the low-pass filter 42 and is converted to a voltage signal having a level corresponding to the amplitude of the output signal. The voltage signal passes through the A/D conversion circuit 43 to be converted to a digital signal and is input to the control unit 41.

In this modification, the control unit 41 can detect a foreign object as in the above-described embodiment.

What is claimed is:

1. A card reader for use with a magnetic card on which magnetic information is recorded, the card reader comprising:
   a transport path structured to transport the magnetic card;
   a housing internally provided with the transport path;
   a magnetic head structured to read the magnetic information at a reading position of the transport path in a transport direction of the magnetic card; and
   a first inductive proximity sensor comprising:
      a first oscillation circuit; and
      a first detection coil and a second detection coil connected in parallel to the first oscillation circuit,
   the magnetic head being accessible to the magnetic card from a first side of the transport path in a first direction perpendicular to a transport face of the magnetic card in the transport path,
   a coil center line of the first detection coil and a coil center line of the second detection coil extending in the first direction on the first side of the transport path in the first direction, and
   the first detection coil and the second detection coil being disposed adjacent to each other in the transport direction and structured to generate magnetic fields in opposite directions in the first direction when the first inductive proximity sensor is driven.

2. The card reader according to claim 1, wherein the first detection coil and the second detection coil have opposite winding directions with each other in view from the first direction.

3. The card reader according to claim 2, wherein the first detection coil and the second detection coil are disposed at a same position as a position of the magnetic head along a width direction of the transport path orthogonal to the transport direction and the first direction, and are disposed at positions different from a position of the magnetic head along the transport direction.

4. The card reader according to claim 3, further comprising:
   a plate member extending in the transport direction and defining a portion of the transport face,
   wherein the first detection coil and the second detection coil are disposed on a side of the transport path opposite to the plate member.

5. The card reader according to claim 4, further comprising:
   a second inductive proximity sensor comprising:
      a second oscillation circuit; and
      a third detection coil connected to the second oscillation circuit, wherein,
   a coil center line of the third detection coil extends in the first direction on the first side of the transport path in the first direction, and
   the third detection coil is disposed on a side of the magnetic head opposite to the first detection coil and the second detection coil in the transport direction.

6. The card reader according to claim 5, wherein,
   the housing comprises an insertion slot for inserting the magnetic card into the transport path,
   the third detection coil is disposed closer to the insertion slot than the magnetic head, and
   the first detection coil and the second detection coil are disposed on a side of the magnetic head opposite to the insertion slot.

7. The card reader according to claim 6, further comprising:
   a support mechanism structured to support the magnetic head such that the magnetic head is shiftable in the first direction, wherein,
   the support mechanism comprises a resilient metal plate member extending along the transport path on a side of the transport path opposite to the first detection coil and the second detection coil in the first direction,
   the magnetic head is disposed on the resilient metal plate member, and
   a first distance between the transport face and the first detection coil or the second detection coil in the first direction is shorter than a second distance between the resilient metal plate member and the first detection coil or the second detection coil in the first direction.

8. The card reader according to claim 4, further comprising:
   a support mechanism structured to support the magnetic head such that the magnetic head is shiftable in the first direction, wherein,
   the support mechanism comprises a resilient metal plate member extending along the transport path on a side of the transport path opposite to the first detection coil and the second detection coil in the first direction,
   the magnetic head is disposed on the resilient metal plate member, and
   a first distance between the transport face and the first detection coil or the second detection coil in the first direction is shorter than a second distance between the resilient metal plate member and the first detection coil or the second detection coil in the first direction.

9. The card reader according to claim 3, further comprising:
   a support mechanism structured to support the magnetic head such that the magnetic head is shiftable in the first direction, wherein,
   the support mechanism comprises a resilient metal plate member extending along the transport path on a side of the transport path opposite to the first detection coil and the second detection coil in the first direction,
   the magnetic head is disposed on the resilient metal plate member, and
   a first distance between the transport face and the first detection coil or the second detection coil in the first direction is shorter than a second distance between the resilient metal plate member and the first detection coil or the second detection coil in the first direction.

10. The card reader according to claim 1, wherein the first detection coil and the second detection coil are disposed at the same position as the position of the magnetic head along a width direction of the transport path orthogonal to the transport direction and the first direction, and are disposed at positions different from the position of the magnetic head along the transport direction.

11. The card reader according to claim 10, further comprising:
   a plate member extending in the transport direction and defining a portion of the transport face,
   wherein the first detection coil and the second detection coil are disposed on a side of the transport path opposite to the plate member.

12. The card reader according to claim 11, further comprising:
   a support mechanism structured to support the magnetic head such that the magnetic head is shiftable in the first direction, wherein,
   the support mechanism comprises a resilient metal plate member extending along the transport path on a side of the transport path opposite to the first detection coil and the second detection coil in the first direction, the magnetic head is disposed on the resilient metal plate member, and a first distance between the transport face and the first detection coil or the second detection coil in the first direction is shorter than a second distance between the resilient metal plate member and the first detection coil or the second detection coil in the first direction.

13. The card reader according to claim 10, further comprising:
  a second inductive proximity sensor comprising:
    a second oscillation circuit; and
    a third detection coil connected to the second oscillation circuit, wherein,
  a coil center line of the third detection coil extends in the first direction on the first side of the transport path in the first direction, and
  the third detection coil is disposed on a side of the magnetic head opposite to the first detection coil and the second detection coil in the transport direction.

14. The card reader according to claim 13, wherein,
the housing comprises an insertion slot for inserting the magnetic card into the transport path,
the third detection coil is disposed closer to the insertion slot than the magnetic head, and
the first detection coil and the second detection coil are disposed on a side of the magnetic head opposite to the insertion slot.

15. The card reader according to claim 10, further comprising:
  a support mechanism structured to support the magnetic head such that the magnetic head is shiftable in the first direction, wherein,
  the support mechanism comprises a resilient metal plate member extending along the transport path on a side of the transport path opposite to the first detection coil and the second detection coil in the first direction,
  the magnetic head is disposed on the resilient metal plate member, and
  a first distance between the transport face and the first detection coil or the second detection coil in the first direction is shorter than a second distance between the resilient metal plate member and the first detection coil or the second detection coil in the first direction.

16. The card reader according to claim 1, further comprising:
  a plate member extending in the transport direction and defining a portion of the transport face,
  wherein the first detection coil and the second detection coil are disposed on a side of the transport path opposite to the plate member.

17. The card reader according to claim 16, further comprising:
  a support mechanism structured to support the magnetic head such that the magnetic head is shiftable in the first direction, wherein,
  the support mechanism comprises a resilient metal plate member extending along the transport path on a side of the transport path opposite to the first detection coil and the second detection coil in the first direction,
  the magnetic head is disposed on the resilient metal plate member, and
  a first distance between the transport face and the first detection coil or the second detection coil in the first direction is shorter than a second distance between the resilient metal plate member and the first detection coil or the second detection coil in the first direction.

18. The card reader according to claim 1, further comprising:
  a second inductive proximity sensor comprising:
    a second oscillation circuit; and
    a third detection coil connected to the second oscillation circuit, wherein,
  a coil center line of the third detection coil extends in the first direction on the first side of the transport path in the first direction, and
  the third detection coil is disposed on a side of the magnetic head opposite to the first detection coil and the second detection coil in the transport direction.

19. The card reader according to claim 18, wherein,
the housing comprises an insertion slot for inserting the magnetic card into the transport path,
the third detection coil is disposed closer to the insertion slot than the magnetic head, and
the first detection coil and the second detection coil are disposed on a side of the magnetic head opposite to the insertion slot.

20. The card reader according to claim 1, further comprising:
  a support mechanism structured to support the magnetic head such that the magnetic head is shiftable in the first direction, wherein,
  the support mechanism comprises a resilient metal plate member extending along the transport path on a side of the transport path opposite to the first detection coil and the second detection coil in the first direction,
  the magnetic head is disposed on the resilient metal plate member, and
  a first distance between the transport face and the first detection coil or the second detection coil in the first direction is shorter than a second distance between the resilient metal plate member and the first detection coil or the second detection coil in the first direction.

* * * * *